July 22, 1947.  J. R. WOODYARD  2,424,263

RADIO SYSTEM FOR DISTANCE AND VELOCITY MEASUREMENT

Filed Feb. 23, 1943  2 Sheets-Sheet 1

INVENTOR
J. R. WOODYARD
BY Paul B. Hunter
ATTORNEY

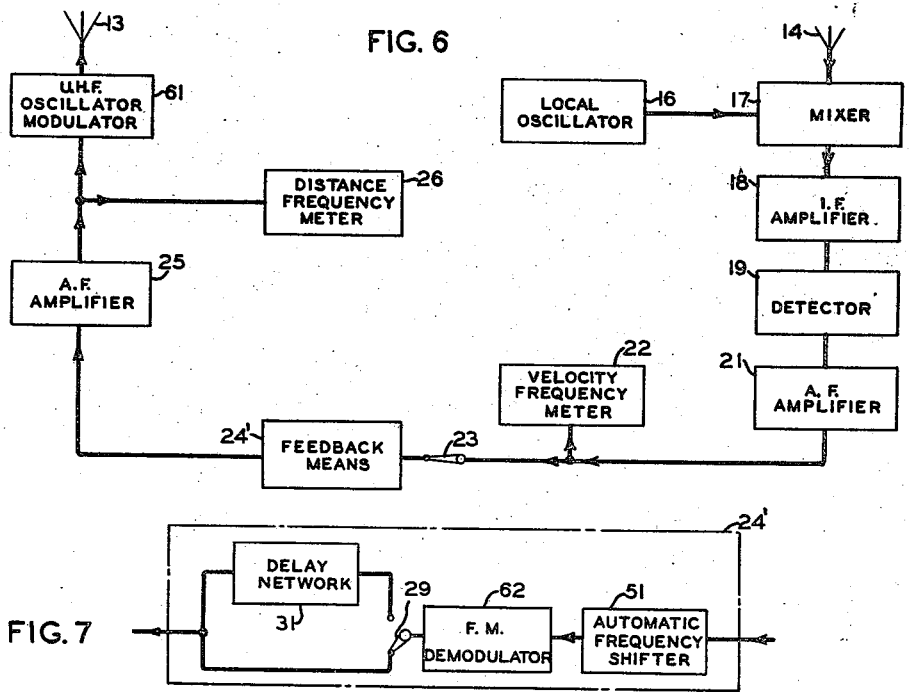
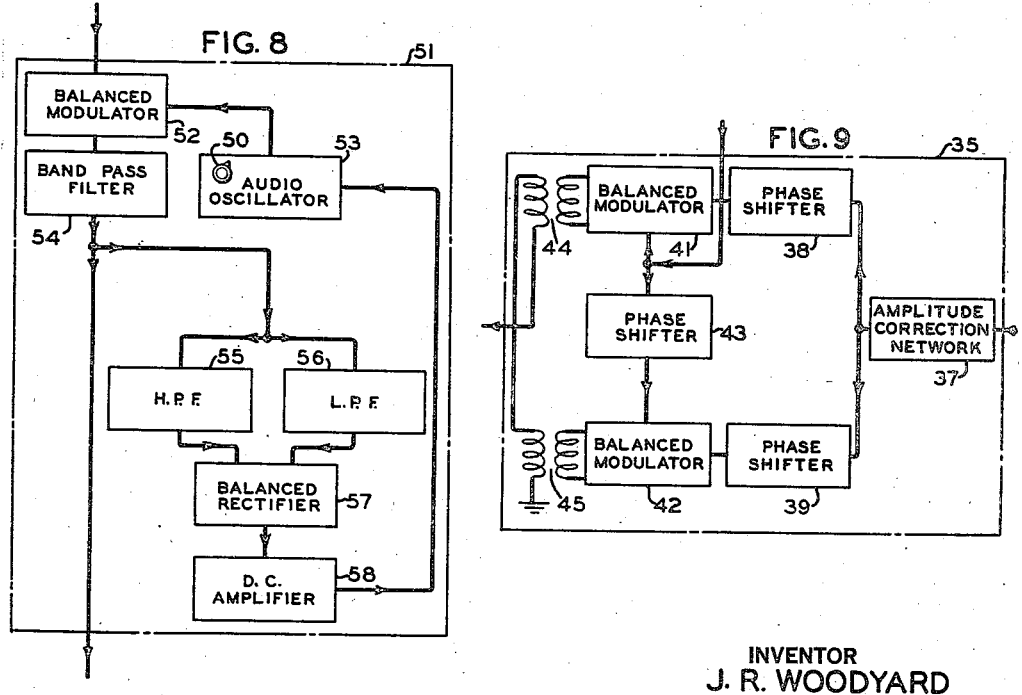

Patented July 22, 1947

2,424,263

UNITED STATES PATENT OFFICE 2,424,263

RADIO SYSTEM FOR DISTANCE AND VELOCITY MEASUREMENT

John R. Woodyard, Garden City, N. Y., assignor to Sperry Gyroscope Company, Inc., Brooklyn, N. Y., a corporation of New York Application February 23, 1943, Serial No. 476,845

13 Claims. (Cl. 250—1.56)

The present invention relates, generally, to radio object detection and location and, more particularly, to novel means and methods for measuring the distance to objects with radio systems employing the Doppler phenomenon for detection.

It is well known that when a reflecting object has a component of velocity relative to a radio transmitter, that portion of the intercepted radiant energy which is returned toward the radiation source differs in frequency from the transmitted energy because of the Doppler phenomenon. This difference in frequency may be called the Doppler-shift frequency or Doppler beat note and is expressed with good accuracy by the equation $$f_d = \frac{2Vf}{C} \quad (1)$$

where $f_d$ is the Doppler beat note, V is the radial component of velocity of the object relative to the source of radiation, $f$ is the transmitted frequency, and C is the velocity of electromagnetic radiation. The transmitted and reflected waves may be mixed in a detector to produce the Doppler beat note revealing the presence of the moving object, and this frequency may be readily measured to provide an accurate knowledge of the radial velocity of the object. The distance to the object, however, is not so easily measured in systems previously proposed.

It is therefore an object of the present invention to provide methods and means for simply and accurately measuring distance in radio object detecting and locating systems by generating a frequency which depends upon the distance to the object.

Another object lies in the provision of a radio distance measuring system comprising a modulated transmitter, a receiver, and selective positive feedback means for connecting the output of said receiver to the modulation input of said transmitter in order that a moving reflecting object in the radiation field of said transmitter, by coupling the same to the input of said receiver, may complete a closed propagation path wherein distance-controlled self-oscillation or "singing" may become established.

Yet another object is to provide, in radio object detecting and locating systems utilizing the Doppler phenomenon, means for obtaining a signal corresponding to the modulation of the Doppler beat frequency, means for amplifying this signal, means for modulating a characteristic of the transmitted wave with this amplified signal, and means for measuring the frequency of the modulation signal for the purpose of distance determination.

A further object is to provide distance measuring systems of the character described wherein the zero distance modulation frequency of the Doppler beat note may be selected at will by the choice of delay network inserted in the positive feedback means.

Other objects and advantages will become apparent from the specification, taken in connection with the accompanying drawings wherein the invention is embodied in concrete form.

In the drawings,

Fig. 6 is a block diagram of an alternate embodiment of the present invention.

Fig. 7 is a block diagram of the feedback means employed in the structure of Fig. 6.

Fig. 8 is a block diagram of an automatic frequency shifting circuit.

Fig. 9 is a block diagram of a frequency adding circuit.

Similar characters of reference are used in all of the above figures to indicate corresponding parts.

In its essential embodiment the present invention comprises a frequency or amplitude modulated transmitter, a receiver which provides a Doppler beat note when a moving object is in the radiation field of the system, and selecting positive feedback means between the receiver and the transmitter. The feedback means demodulates the Doppler beat note, eliminates the Doppler beat note from the resultant frequencies, and modulates either the amplitude or the frequency of the transmitted wave with these frequencies according to whether A. M. or F. M. demodulation is employed. Thus there is created a closed propagation path comprising the transmitter, the radiation coupling of the moving obstacle, the receiver, and the selective positive feedback means. If sufficient amplification is provided to overcome the attenuation around this closed path, self-oscillations will build up having a fundamental frequency inversely proportional to the sum of the time delays encountered by a disturbance in passing once around the closed path. The system may be likened to a conventional regenerative amplifier wherein the positive feedback is made sufficient to develop and maintain continuous oscillations, and the analogy should not be obscured by the fact that this closed loop has a radio link instead of being solely conductive. The fundamental frequency of oscillation may be expressed by the equation $$f_e = \frac{1}{\frac{2S}{C}+T} \qquad (2)$$

where $f_e$ is the self-oscillation or "sing" frequency, S is the distance to the object, C is the velocity of electromagnetic radiation, and T is the time delay occurring in the conductive portion of the closed loop. Thus a frequency meter, responsive to $f_e$, may be calibrated directly in terms of distance.

Figure 1:
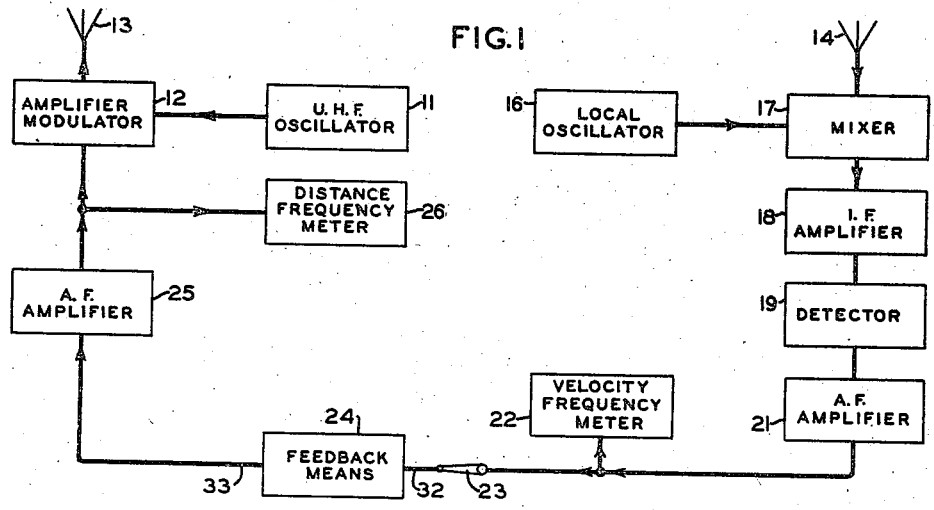
Fig. 1 is a block diagram of an embodiment of the present invention.

Referring now to Fig. 1, there is disclosed a simple continuous wave object detecting and locating system with which the distance measuring means of the present invention may be employed. An ultra high frequency oscillator 11 supplies a carrier wave $f$ to an amplifier-modulator 12 whose output is fed to a radiator 13. Radiator 13, having suitable directivity according to the desired application, projects the carrier wave into space. The presence in the radiation field of an object such as an aircraft, ship, or automobile causes scattering or reflection of the intercepted energy, a portion of which is directed back toward the system.

A receiving antenna 14 in the vicinity of radiator 13, but not necessarily in close proximity, has a directivity pattern at least a portion of which overlaps the radiation field of the latter. Antenna 14 is responsive to energy from reflecting objects as well as to that portion of the carrier wave which leaks directly from radiator 13 or is returned by ground scattering. If any object has a radial component velocity with respect to the system, the energy received therefrom has a frequency $f+f_d$ or $f-f_d$, above or below the carrier frequency $f$ according to whether the object is approaching or receding, respectively, and the frequency difference $f_d$ is proportional to the radial velocity as has been previously pointed out.

The received frequencies $f$ and $f+$ or $-f_d$ are fed to a mixer 17 together with the frequency from a local oscillator 16. The mixer 17 may be of the well known crystal type while the local oscillator 16 is adapted to generate a wave spaced a convenient intermediate frequency from $f$. Oscillators 11 and 16 may be made to maintain a constant frequency difference by automatic frequency control, crystal oscillator and multiplier chains, or similar systems which are incidental to the operation of the present invention. The received frequencies and that from the local oscillator 16 heterodyne in the mixer 17 to produce among others an intermediate frequency and a frequency differing from this by $+$ or $-f_d$.

An intermediate frequency amplifier 18 selects the above two frequencies and amplifies them before supplying them to a detector 19. Since these two frequencies are equivalent to a carrier and a single side band, the Doppler beat frequency is produced in the detector 19. This beat frequency is then amplified in an audio amplifier 21 and supplied to a velocity measuring frequency meter 22.

Thus far described, the apparatus constitutes an entirely conventional object detecting and radial velocity measuring system. Since the function of the receiver is to obtain the Doppler beat note, the exact structure is incidental to the invention. For example, a tuned radio frequency receiver may be employed with equal fitness instead of the illustrated superheterodyne construction.

The novel means for measuring distance to the detected object will now be described. The audio amplifier 21 is connected through a switch 23 to an input lead 32 of a feedback means 24. The function of the feedback means 24 is to reproduce in its output circuit any variations that may occur in the amplitude of the Doppler beat note wave while preventing the passage of this Doppler beat note itself. The feedback means 24 supplies these amplitude variations over a lead 33 to an audio amplifier 25. The amplifier 25 impresses an amplified version of such variations of the beat note wave upon the signal input of the amplifier-modulator 12. A distance indicating frequency meter 26 is connected to measure the frequency of these variations.

The operation of the distance measuring means of Fig. 1 will now be explained. When a moving object is in the radiation field of the system, the Doppler beat note $f_d$ produced by the amplifier 21 is subject to the usual infinitesimal random fluctuations caused by the receiver and external noise. When the switch 23 closes the circuit between the amplifier 21 and the feedback means 24, these fluctuations are detected by the feedback means, amplified by amplifier 25, and then employed to modulate the amplitude of the ultra high frequency carrier $f$ emitted by the radiator 13. Variations of a certain frequency, dependent upon the distance to the moving object, travel from the transmitter out to the point of reflection and arrive back at the receiver in time to reinforce fluctuations at this frequency. If there is sufficient amplification between the receiver and the transmitter, self-oscillation will be built up having a fundamental frequency inversely proportional to this transit time around the entire system. Frequency meter 26 may thus be directly calibrated in terms of distance, as determined by the envelope frequency of the Doppler beat note wave. The system is not affected by stationary objects or ground scattering, since when there is no moving object in the radiant beam, no Doppler shift frequency is provided.

Comparing Equations 1 and 2, it is observed that for certain combinations of distance, velocity, carrier frequency, and circuit time delay, the Doppler beat note $f_d$ and its envelope wave $f_e$ overlap. When an object approaches the system, $f_e$ may first be below, then equal to, and finally above $f_d$. In other words, the modulation frequency may be equal or higher than the audio "carrier" frequency, which is the reverse of the situation encountered in ordinary radio communication. The separation of $f_d$ and $f_e$ is necessary to prevent self-oscillation of the system through direct coupling between radiators 13 and 14. To accomplish this separation, feedback means 24 may have a plurality of forms to suit the particular conditions.

Figure 2:
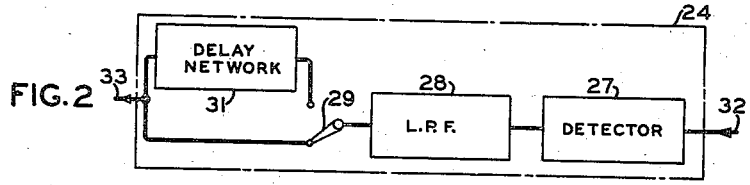
Figs. 2, 3, 4 and 5 are block diagrams of possible forms of the feedback means employed in the structure of Fig. 1.

Fig. 2 illustrates a suitable structure for feedback means 24 under the conditions when the envelope frequency is lower than the Doppler shift frequency throughout the desired range of distances. The feedback means 24 comprises a detector 27, preferably but not necessarily of a type providing full wave detection such as a pair of diodes in push-pull relation, a low pass filter 28 attached to the detector output, and a single-pole double-throw switch 29. Switch 29 connects the output of the low pass filter 28 in one position directly to the external lead 33 and in the other position connects to lead 33 by way of a delay network 31.

Network 31 provides a predetermined and preferably constant time delay over the desired band of envelope frequencies, and may take the form of an artificial transmission line, well known in the art.

In the operation of the feedback means illustrated in Fig. 2, the detector 27 reproduces the envelope of the modulated Doppler beat note wave, and the low pass filter 28 suppresses the Doppler shift frequency, passing only the envelope frequency through to the external lead 33. If full wave detection is employed only harmonics of the Doppler frequency appear in the output of device 27 together with the envelope frequency. Under these conditions, filter 28 need only attenuate the residual Doppler frequency caused by any unbalance in detector 27.

For close objects it is desirable to employ the delay network 31 to maintain the envelope frequency substantially below its audio "carrier." The function of the delay network 31 may be understood by recalling Equation 2. It is seen that if the circuit time delay T is negligible, then the envelope frequency $f_e$ is exceedingly high for short distances. Not only would the envelope frequency then overlap or exceed the Doppler beat note, but the band width required in the various amplifiers to accommodate the possible envelope frequencies would then be excessive and the signal-to-noise ratio of the system would be impaired.

The network 31 is therefore employed to introduce a desired time delay, thus determining the frequency corresponding to zero distance and limiting the band width required to measure a given range of distances.

Figure 3:
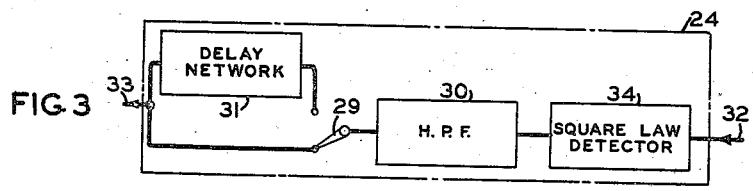

Fig. 3 illustrates a suitable structure for the feedback means 24 under the conditions when the envelope frequency is always higher than the Doppler beat note. For example, these conditions exist in an aircraft warning system where use is made of wavelengths of, say, 100 centimeters or longer. Although the radiation of these lower frequencies is less easily directed, the choice of these frequencies has the advantage of increasing the maximum possible detection distance because of greater reflection from objects, and reduced receiver noise. The feedback means 24 comprises a detector 34, preferably but not necessarily of the balanced square law type, a high pass filter 30 attached to the detector output, and the switch 29 and associated delay network 31.

In the operation of the structure of the feedback means 24 illustrated in Fig. 3, the detector 34 reproduces the envelope frequency in its output, together with the Doppler shift frequency. The Doppler shift frequency is, however, attenuated by the high pass filter 30 which freely passes the envelope frequency. The delay network 31 may be optionally employed to alter the frequency limits corresponding to the desired range of distances. If a balanced detector is employed, the Doppler frequency is substantially eliminated from the output of device 34 and the required selectivity of filter 30 is thus reduced.

Figure 4:
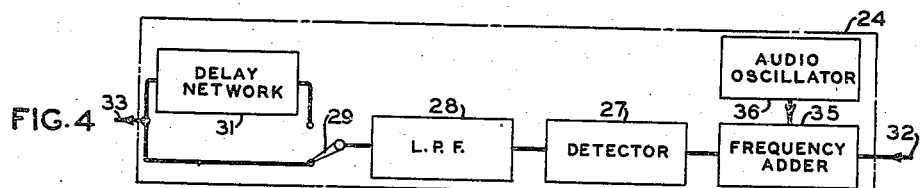

Referring now to Fig. 4 there is illustrated a simple structure for the feedback means 24 under the conditions when the "sing" frequency and the Doppler beat note substantially overlap. Separation is accomplished by increasing the frequency of the modulated Doppler wave in a frequency adding circuit 35 an amount $f_1$ sufficient to maintain the audio "carrier" always appreciably higher than its modulation envelope and thus permit the detection and separation of the envelope frequency by circuits similar to those shown in Fig. 2. The frequency adding circuit 35, which is described in more detail with reference to Fig. 9, is adapted to add the frequency $f_1$ from an audio oscillator 36 to the Doppler beat note wave and supply the sum of these frequencies to the detector 27. The detector 27 reproduces the envelope frequency now separated sufficiently from its carrier to enable the low pass filter 28 to attenuate this carrier but allow transmission of the envelope frequency. The low pass filter 28 as employed in Fig. 4 need not possess a sharp cut-off characteristic since $f_1$ may be chosen sufficiently higher than any value of $f_e$. This simplifies the filter design and, at the same time, eliminates transient effects and variations in time delay as a function of frequency. The oscillator 36 need not be particularly stable since its function is merely to aid in separating $f_e$ from $f_d$, and $f_1$ does not appear in the measurements.

A possible form of the frequency adder 35 is shown in Fig. 9 having a structure similar to a circuit described by P. Loyet in the Proceedings of the I. R. E., May 1942, p. 216, wherein single side bands are produced by a system of phase rotation without the necessity for sharp filtering. The input circuit of frequency adder 35 consists of an amplitude correcting network 37 which equalizes any frequency distortion produced by the device 35. Network 37 connects to phase shifters 38 and 39 designed to provide a substantially constant 90° difference in phase delay over a desired frequency band. The outputs of phase shifters 38 and 39 supply the carrier inputs of two conventional balanced modulators 41 and 42, respectively. The signal input of modulator 41 is connected directly to the audio oscillator 36 while the similar input of modulator 42 is supplied through a —90° phase shifter 43 from the same source. Output transformers 44 and 45 of modulators 41 and 42, respectively, are connected in phase opposition. If $E_d \cos 2\pi f_d t$ and $E_1 \cos 2\pi f_1 t$ represent the carrier and signal voltages, respectively, applied to modulator 41, then $E_d \sin 2\pi f_d t$ and $E_1 \sin 2\pi f_1 t$ are the corresponding voltages applied to similar modulator 42, and the output waves are $mE \cos 2\pi f_d t \cos 2\pi f_1 t$ and $mE \sin 2\pi f_d t \sin 2\pi f_1 t$, respectively, where $m$ is the degree of modulation. The difference in these two waves by a simple trigonometric relationship is seen to be equal to $mE \cos (2\pi f_d + 2\pi f_1) t$, the upper side band frequency.

Figure 5:
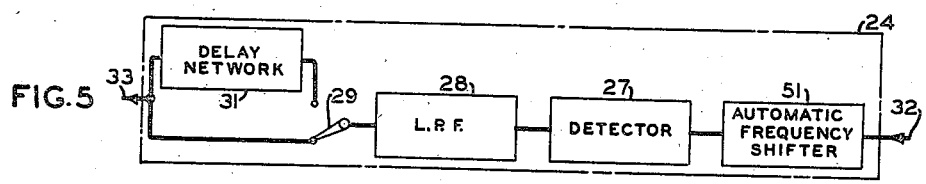

Fig. 5 illustrates an alternative structure for the feedback means 24 for use under the conditions of overlapping envelope and Doppler frequencies. The feedback means 24 comprises an automatic frequency shifter 51 which is adapted to raise the modulated Doppler beat note wave to a substantially fixed frequency which is sufficiently high to enable separation of the envelope frequency from its audio "carrier" by a structure similar to that illustrated in Fig. 2.

A possible form of automatic frequency shifter is shown in Fig. 8 wherein the Doppler beat note wave, whose frequency is dependent upon the radial velocity of the detected object, is supplied to the carrier input of a balanced modulator 52. The Doppler beat note wave is modulated by a suitably varied signal frequency from an audio oscillator 53 to provide substantially constant side band frequencies in the output of the modulator 52. The Doppler beat note is suppressed by the balancing action of the modulator 52, and the newly created upper side band is transmitted by a band pass filter 54. This side band is modulated by the envelope frequency $f_e$ which may be detected in the usual manner.

An automatic frequency control is provided to maintain the output frequency of modulator 52 substantially constant irrespective of changes in the Doppler shift frequency. A high pass filter 55 and a low pass filter 56 are connected for control purposes to the output of the band pass filter 54. The cut-off frequencies of high and low pass filters 55 and 56, respectively, approximately correspond to the upper and lower cut-off frequencies, respectively, of band pass filter 54; consequently the attenuation of filters 55 and 56 is substantially the same in the center of the transmission band of filter 54. The circuits 55 and 56 supply parallel inputs of a balanced rectifier 57 which has a filter network to eliminate alternating components from its output.

Rectifier 57 provides a direct voltage which is proportional to the algebraic difference between the two input voltages. Thus, the direct voltage is of one polarity, zero, or of the opposite polarity, according to whether the upper side band frequency from modulator 52 lies to one side, in the center, or to the opposite side, respectively, of the transmission band of filter 54. The output of rectifier 57 is connected to a direct voltage amplifier 58 which supplies an amplified control voltage to the variable oscillator 53. This control voltage may be impressed on a split field winding direct current motor which mechanically actuates the tuning mechanism of the oscillator, or employed to alter an inductance, capacitance, or resistance in the frequency determining network by any of the well known electronic methods.

In the operation of Fig. 8 a frequency control knob 59 on the audio oscillator 53 is manually set according to the momentary Doppler beat note to provide the desired frequency at the output of modulator 52. An increase in the Doppler frequency raises the output wave of modulator 52 above the equilibrium frequency, causing more transmission through high pass filter 55 than through the low pass filter 56. The balanced rectifier 57 thereupon produces a control voltage of such a polarity as to reduce the frequency of the audio oscillator 53 and thereby return the output wave of modulator 52 to the normal frequency. On the other hand, a decrease in the Doppler frequency reduces the output frequency of modulator 52, and the action of devices 55, 56, 57, and 53 is to provide a control voltage which actuates oscillator 53 to supply an increased frequency to re-establish the equilibrium.

It has been pointed out that the distance-controlled self-oscillation or "sing" frequency may be established by frequency demodulating the Doppler beat note and frequency modulating the transmitted carrier wave at the rate of frequency variation of this audio note. Fig. 6 illustrates a simple radio object locator system employing frequency modulation for building up the "sing" frequency wave. The apparatus of Fig. 6 may be substantially the same as that shown in Fig. 1, with the exception that in place of oscillator 11 and amplifier-modulator 12 there is substituted an ultra high frequency oscillator-modulator 61 adapted to frequency modulate the transmitted wave with the output wave of amplifier 25. The feedback means 24 has its reference numeral changed to 24' to indicate that the circuit is now responsive to frequency modulation, although its function remains that of separating the "sing" frequency from the Doppler beat note.

The operation of Fig. 6 is the same as Fig. 1 until switch 23 is closed, $f_d$ being provided in the previous manner to the meter 22 to indicate the presence of a moving object. Feedback means 24' converts any phase or frequency variation of the Doppler beat note into an audio frequency, which is supplied in amplified form to frequency modulate the carrier wave generated in oscillator-modulator 61. Since the Doppler beat note is dependent upon the transmitted frequency as indicated in Equation 1, $f_d$ appearing in the output of amplifier 21 is phase or frequency modulated according to the extent of the frequency swing of the transmitted wave. This frequency modulated Doppler beat note is supplied to feedback means 24', and thus the "sing" frequency is built up within the closed propagation path.

Frequency modulation in a system such as that shown in Fig. 6 produces other audio frequencies in the output of the amplifier 21 because the reflected carrier frequency is not only shifted in proportion to the radial velocity of the detected object, but also differs from the frequency, being radiated at the instant of reception by a small amount, which is proportional to the change in frequency which has occurred during the transit time of the carrier wave to the reflecting object and back. The frequencies comprise sums and differences of the fundamental and harmonics of $f_e$ and $f_d$, respectively. These audio components do not disturb the operation of the system since they are not frequency modulated, and $f_e$ cannot exist apart from $f_d$.

Fig. 7 illustrates a suitable structure for the feedback means 24'. Apparatus 24' comprises the automatic frequency shifter 51, a frequency demodulator 62, and switch 29 and associated delay network 31. In operation, frequency shifter 51 raises the Doppler beat note to the average frequency for which demodulator 62 is designed. A limiter and filter may be incorporated in device 62 to eliminate undesired amplitude modulation detection and other spurious frequencies. The operation of the feedback means 24' is stable because only when the Doppler beat note is being tracked can self-oscillation build up, and only when self-oscillation exists are the audio components referred to above present.

The amplifier 25 employed in the structures of Figs. 1 and 6 may have an automatic volume control circuit incorporated therein for the purpose of providing a substantially constant amplitude modulation voltage. By providing only just sufficient positive feedback to cause self-oscillation, the wave form of $f_e$ may be kept relatively undistorted. This is a desirable condition although not essential to the satisfactory operation of the systems.

The frequency meter 26, since it is provided with a single unmodulated frequency, may well be of the direct reading vibrating reed type, but may equally well comprise a zero beat measuring device calibrated by a crystal controlled oscillator to provide extremely precise distance determination.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A method of establishing self-oscillation in a radio system for the purpose of distance determination, comprising the steps of radiating an ultra high frequency wave into space, receiving the wave after reflection from an object having motion relative to said system, comparing the frequencies of radiated and reflected waves to obtain a difference frequency wave, detecting amplitude variations of the difference frequency wave, and varying the amplitude of the radiated wave in accordance with amplitude variation of the difference frequency wave.

2. A method of establishing self-oscillation in a radio system for the purpose of distance determination, comprising the steps of radiating an ultra high frequency wave into space, receiving the wave after reflection from an object having motion relative to said system, beating together the frequencies of radiated and reflected waves to obtain a difference frequency wave, detecting phase variations of the difference frequency wave, and varying the frequency of the radiated wave in accordance with phase variation of the difference frequency wave.

3. A method of determining the distance of objects from measuring apparatus, comprising the steps of transmitting waves into space, receiving waves reflected from an object having motion relative to said apparatus, mixing transmitted and reflected waves to obtain a Doppler beat note, demodulating said beat note to obtain a periodic signal wave, modulating the transmitted waves with said signal wave, and measuring the resultant signal frequency.

4. A method of determining the distance of remote objects from measuring apparatus, comprising the steps of transmitting ultra high frequency electromagnetic waves into space, receiving waves reflected from an object having motion relative to said apparatus, mixing transmitted and reflected waves to obtain a Doppler beat note, modulating the amplitude of the transmitted waves in accordance with the envelope of the Doppler beat note, and measuring the resultant modulation frequency.

5. A method of determining the distance of remote objects from measuring apparatus, comprising the steps of transmitting ultra high frequency electromagnetic waves into space, receiving waves reflected from an object having motion relative to said apparatus, mixing transmitted and reflected waves to obtain a Doppler beat note, modulating the frequency of the transmitted waves in accordance with phase modulation of the Doppler beat note, and measuring the resultant modulation frequency.

6. A method of determining distance of an object from measuring apparatus, comprising the steps of radiating a wave into space, receiving a portion of the wave as reflected from the object, comparing the frequencies of radiated and reflected waves to obtain a beat note wave having a frequency substantially proportional to the time rate of change of distance between the object and the apparatus, demodulating said beat note wave to obtain a periodic signal, varying a characteristic of the radiated wave in accordance with said signal wave, and measuring the frequency of said signal wave as a function of distance.

7. A radio object detecting and locating system comprising, means for generating ultra high frequency electro-magnetic waves, means for modulating said waves, means for radiating said modulated waves into space, means for receiving the waves after reflection from an object having a distance to said system changing with time, means for mixing the radiated and reflected waves to produce audio waves having a frequency in accordance with the velocity of the object relative to said system, said audio waves being modulated in accordance with the modulation of said ultra high frequency waves, and means for demodulating said audio waves, said demodulating means serving to supply a periodic modulating signal to said modulating means.

8. A radio object detecting and locating system comprising, a modulated transmitter, a receiver having an output responsive only to energy reflected from moving objects, and regenerative feedback means connecting the output of said receiver to said modulated transmitter, said feedback means serving, together with the radiation coupling between transmitter output and receiver input caused by a moving object, to complete a closed propagation path wherein self-oscillation occurs at a frequency dependent upon the distance to the object.

9. Means for measuring distance to a moving object in terms of frequency comprising, a transmitter of electromagnetic waves, a receiver coupled to said transmitter by radiation linkage with the object, means connected to said receiver for separating energy due to the radiation linkage with the object from other forms of coupling between transmitter and receiver, means responsive to a periodic characteristic of the energy due to said linkage, said responsive means interconnecting said energy separating means and said transmitter, and means for modulating the transmitted waves with said energy characteristic, thus completing a closed propagation path in which oscillations are established having a frequency dependent upon the distance to the object.

10. A radio object detecting and locating system comprising, means for transmitting electromagnetic energy into space, means for receiving a portion of said energy after reflection from an object having motion relative to said system, means for mixing the transmitted and reflected energies to produce a beat note, and means interconnecting said mixing and said transmitting means for varying the amplitude of the transmitted energy in accordance with variation in amplitude of the beat note.

11. In a radio distance measuring system utilizing the Doppler principle for detecting objects moving relative to said system, the steps of transmitting energy toward a moving object, deriving a Doppler beat frequency corresponding to the frequency difference between the transmitted energy and energy reflected from said object, demodulating the Doppler beat wave to obtain a periodic signal and modulating the transmitted energy with said signal.

12. In radio object detecting and locating systems utilizing the Doppler principle, the combination comprising means for transmitting energy toward a moving object, means for deriving a Doppler beat frequency corresponding to the frequency difference between the transmitted energy and energy reflected from said object, means for obtaining a wave corresponding to a signal effecting phase modulation of the Doppler beat frequency, and means for frequency modulating the transmitted energy with said wave.

13. In radio object detecting and locating systems utilizing the Doppler principle, the combination comprising means for transmitting energy toward a moving object, means for deriving a Doppler beat frequency corresponding to the frequency difference between the transmitted energy and energy reflected from said object, means for obtaining a wave corresponding to the amplitude envelope of the Doppler beat frequency, and means for modulating the amplitude of the transmitted energy with said wave.

JOHN R. WOODYARD.

REFERENCES CITED

The following references are of record in the file of this patent:

UNITED STATES PATENTS

| Number | Name | Date |
| --- | --- | --- |
| 2,268,643 | Crosby | Jan. 6, 1942 |
| 1,945,952 | Nicolson | Feb. 6, 1934 |

FOREIGN PATENTS

| Number | Country | Date |
| --- | --- | --- |
| 108,875 | Australia | Oct. 20, 1939 |

Certificate of Correction

Patent No. 2,424,263. July 22, 1947.

JOHN R. WOODYARD

It is hereby certified that errors appear in the printed specification of the above numbered patent requiring correction as follows: Column 2, line 35, for "selecting" read *selective*; column 10, line 2, claim 6, after "signal" insert *wave*; line 69, claim 11, after "beat" insert *frequency*; and that the said Letters Patent should be read with these corrections therein that the same may conform to the record of the case in the Patent Office.

Signed and sealed this 11th day of November, A. D. 1947.

[SEAL]

THOMAS F. MURPHY,
*Assistant Commissioner of Patents.*